(12) United States Patent
Patricks

(10) Patent No.: US 11,877,030 B2
(45) Date of Patent: *Jan. 16, 2024

(54) METHODS AND SYSTEMS FOR INTERACTIVE QUEUING FOR SHARED LISTENING SESSIONS

(71) Applicant: Spotify AB, Stockholm (SE)

(72) Inventor: Mattias Anders Malte Patricks, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,392

(22) Filed: Oct. 20, 2022

(65) Prior Publication Data

US 2023/0130141 A1   Apr. 27, 2023

Related U.S. Application Data

(63) Continuation of application No. 16/903,078, filed on Jun. 16, 2020, now Pat. No. 11,503,373.

(51) Int. Cl.
*H04N 21/458*    (2011.01)
*H04N 21/472*    (2011.01)
(Continued)

(52) U.S. Cl.
CPC ........... *H04N 21/472* (2013.01); *H04N 21/25* (2013.01); *H04N 21/251* (2013.01);
(Continued)

(58) Field of Classification Search
CPC .... H04N 21/25; H04N 21/252; H04N 21/258; H04N 21/44222; H04N 21/45;
(Continued)

(56) References Cited

U.S. PATENT DOCUMENTS 5,758,259 A   5/1998   Lawler
5,801,747 A   9/1998   Bedard
(Continued)

FOREIGN PATENT DOCUMENTS

EP   0881591 A1   12/1998
EP   3543865 A1   9/2019
(Continued)

OTHER PUBLICATIONS

Broberg, Office Action, U.S. Appl. No. 16/868,404, dated Mar. 18, 2021, 9 pgs.
(Continued)

*Primary Examiner* — Joshua D Taylor
*Assistant Examiner* — Patrick A Ryan
(74) *Attorney, Agent, or Firm* — Morgan, Lewis & Bockius LLP

(57) ABSTRACT

An electronic device generates a respective user queue for each user of a plurality of users participating in a shared listening session. While providing a first media content item for playback, the device receives a second request, from a first user, to add a second media content item to the shared playback queue and updates the respective user queue for the first user. After receiving the second request, the electronic device receives a third request, from a second user, to add a third media content item to the shared playback queue and updates the respective user queue for the second user. The electronic device updates the shared playback queue using the respective user queues of the first user and the second user, including positioning the third media content item in an order of the shared playback queue to be played back before the second media content item.

20 Claims, 12 Drawing Sheets

(51) Int. Cl.
| | |
|---|---|
| *H04N 21/442* | (2011.01) |
| *H04N 21/25* | (2011.01) |
| *H04N 21/258* | (2011.01) |
| *H04N 21/45* | (2011.01) |
| *H04N 21/466* | (2011.01) |
| *H04N 21/262* | (2011.01) |

(52) U.S. Cl.
CPC ......... *H04N 21/252* (2013.01); *H04N 21/258* (2013.01); *H04N 21/26258* (2013.01); *H04N 21/44222* (2013.01); *H04N 21/45* (2013.01); *H04N 21/458* (2013.01); *H04N 21/4532* (2013.01); *H04N 21/466* (2013.01); *H04N 21/4661* (2013.01)

(58) Field of Classification Search
CPC ............. H04N 21/4532; H04N 21/466; H04N 21/4661; H04N 21/472; H04N 21/458
See application file for complete search history.

(56) References Cited

U.S. PATENT DOCUMENTS

| | | | |
|---|---|---|---|
| 5,848,398 | A | 12/1998 | Martin et al. |
| 6,005,597 | A | 12/1999 | Barrett et al. |
| 6,175,844 | B1 | 1/2001 | Stolin |
| 6,947,922 | B1 | 9/2005 | Glance |
| 9,112,849 | B1 | 8/2015 | Werkelin Ahlin et al. |
| 9,160,786 | B1 | 10/2015 | Jackson |
| 9,432,429 | B1 | 8/2016 | Ho |
| 9,568,994 | B2 | 2/2017 | Jehan |
| 10,063,600 | B1 | 8/2018 | Marsh et al. |
| 10,108,708 | B2 | 10/2018 | O'Driscoll et al. |
| 2002/0174428 | A1 | 11/2002 | Agnihotri et al. |
| 2003/0160770 | A1 | 8/2003 | Zimmerman |
| 2003/0208767 | A1 | 11/2003 | Williamson et al. |
| 2006/0033958 | A1 | 2/2006 | d'Entrecasteaux |
| 2006/0167576 | A1 | 7/2006 | Rosenberg |
| 2006/0242661 | A1 | 10/2006 | Bodlaender et al. |
| 2007/0100481 | A1 | 5/2007 | Toms et al. |
| 2007/0233743 | A1 | 10/2007 | Rosenberg |
| 2008/0091717 | A1 | 4/2008 | Garbow |
| 2008/0166967 | A1 | 7/2008 | McKillop |
| 2008/0261533 | A1 | 10/2008 | Bengtsson |
| 2008/0309647 | A1 | 12/2008 | Blose et al. |
| 2009/0063971 | A1 | 3/2009 | White et al. |
| 2009/0210415 | A1 | 8/2009 | Martin et al. |
| 2009/0217804 | A1 | 9/2009 | Lu et al. |
| 2009/0222392 | A1 | 9/2009 | Martin et al. |
| 2009/0300008 | A1 | 12/2009 | Hangartner et al. |
| 2009/0307731 | A1 | 12/2009 | Beyabani |
| 2010/0044121 | A1 | 2/2010 | Simon et al. |
| 2010/0106799 | A1 | 4/2010 | Calabrese |
| 2010/0205222 | A1 | 8/2010 | Gajdos et al. |
| 2010/0325135 | A1 | 12/2010 | Chen et al. |
| 2011/0004330 | A1 | 1/2011 | Rothkopf et al. |
| 2011/0106744 | A1 | 5/2011 | Becker et al. |
| 2011/0162001 | A1 | 6/2011 | Mehta et al. |
| 2011/0289155 | A1 | 11/2011 | Pimazar |
| 2011/0295843 | A1 | 12/2011 | Ingrassia, Jr. et al. |
| 2011/0314388 | A1 | 12/2011 | Wheatley |
| 2012/0117026 | A1 | 5/2012 | Cassidy |
| 2012/0117488 | A1 | 5/2012 | Amidon et al. |
| 2012/0209954 | A1 | 8/2012 | Wright |
| 2012/0290648 | A1 | 11/2012 | Sharkey |
| 2012/0290653 | A1 | 11/2012 | Sharkey |
| 2013/0018954 | A1 | 1/2013 | Cheng |
| 2013/0031162 | A1 | 1/2013 | Willis et al. |
| 2013/0198633 | A1 | 8/2013 | Hyman |
| 2013/0297599 | A1 | 11/2013 | Henshall |
| 2013/0297698 | A1 | 11/2013 | Odero et al. |
| 2013/0346875 | A1 | 12/2013 | Klein et al. |
| 2014/0028784 | A1 | 1/2014 | Deyerle et al. |
| 2014/0031961 | A1 | 1/2014 | Wansley et al. |
| 2014/0108946 | A1 | 4/2014 | Olofsson |
| 2014/0119407 | A1 | 5/2014 | Miller |
| 2014/0123165 | A1 | 5/2014 | Mukhenjee et al. |
| 2014/0223099 | A1 | 8/2014 | Kidron |
| 2014/0245336 | A1 | 8/2014 | Lewis, II et al. |
| 2014/0277649 | A1 | 9/2014 | Chong et al. |
| 2015/0178624 | A1 | 6/2015 | Chee et al. |
| 2015/0222680 | A1 | 8/2015 | Grover |
| 2015/0249857 | A1 | 9/2015 | Dion et al. |
| 2015/0277852 | A1 | 10/2015 | Burgis |
| 2015/0355879 | A1 | 12/2015 | Beckhardt et al. |
| 2015/0356176 | A1 | 12/2015 | Billinski et al. |
| 2016/0007079 | A1 | 1/2016 | Vega-Zayas et al. |
| 2016/0066038 | A1 | 3/2016 | Chesluk et al. |
| 2016/0080473 | A1 | 3/2016 | Coburn, IV |
| 2016/0085499 | A1 | 3/2016 | Corbin et al. |
| 2016/0127777 | A1 | 5/2016 | Roberts et al. |
| 2016/0156687 | A1 | 6/2016 | Leung |
| 2016/0277802 | A1 | 9/2016 | Bernstein et al. |
| 2016/0292269 | A1 | 10/2016 | O'Driscoll et al. |
| 2016/0292272 | A1 | 10/2016 | O'Driscoll et al. |
| 2016/0330794 | A1 | 11/2016 | Ozcan |
| 2017/0034263 | A1 | 2/2017 | Archambault et al. |
| 2017/0093769 | A1 | 3/2017 | Lind et al. |
| 2017/0093943 | A1 | 3/2017 | Alsina |
| 2017/0103075 | A1 | 4/2017 | Toumpelis |
| 2017/0171898 | A1 | 6/2017 | Jamal-Syed et al. |
| 2017/0251040 | A1 | 8/2017 | Archambault et al. |
| 2017/0289202 | A1 | 10/2017 | Krasadakis |
| 2018/0139155 | A1 | 5/2018 | Kurisu et al. |
| 2019/0018644 | A1 | 1/2019 | Kovacevic et al. |
| 2019/0050483 | A1 | 2/2019 | O'Driscoll et al. |
| 2019/0121823 | A1 | 4/2019 | Miyazaki et al. |
| 2019/0243534 | A1 | 8/2019 | Vega et al. |
| 2019/0325035 | A1 | 10/2019 | Sagui et al. |
| 2019/0370280 | A1 | 12/2019 | Shenoy et al. |
| 2020/0082019 | A1 | 3/2020 | Allen et al. |

FOREIGN PATENT DOCUMENTS

| | | |
|---|---|---|
| EP | 3554091 A1 | 10/2019 |
| WO | WO2016156553 | 10/2016 |
| WO | WO2016156554 | 10/2016 |
| WO | WO2016156555 | 10/2016 |

OTHER PUBLICATIONS

Broberg, Final Office Action, U.S. Appl. No. 16/868,404, dated Aug. 5, 2021, 12 pgs.
Broberg, Notice of Allowance, U.S. Appl. No. 16/868,404, dated Nov. 19, 2021, 7 pgs.
Broberg, Office Action, U.S. Appl. No. 17/677,803, dated Oct. 6, 2022, 11 pgs.
Broberg, Final Office Action, U.S. Appl. No. 17/677,803, dated May 11, 2023, 16 pgs.
Spotify AB, International Search Report and Written Opinion, PCT/EP2016/057176, dated Jun. 14, 2016, 10 pgs.
Hernejarvi, Office Action, U.S. Appl. No. 16/784,090, dated Jan. 29, 2021, 8 pgs.
Hernejarvi, Notice of Allowance, U.S. Appl. No. 16/784,090, dated Mar. 31, 2021, 5 pgs.
Hernejarvi, Office-Action, U.S. Appl. No. 17/362,508, dated May 9, 2022, 13 pgs.
Hernejarvi, Notice of Allowance, U.S. Appl. No. 17/362,508, dated Aug. 17, 2022, 8 pgs.
Nelson Granados, Flo: Finally, an app that lets partygoers mix the playlist on the fly, May 27, 2016, https://www.forbes.com/sites/nelsongranados/2016/05/27/flo-finally-an-app-to-crowdsource-live-the-partys-playlist/#41e8d2a45c41, 4 pgs.
News Watch, Party Play—A collaborative playlist from all your party guests, Oct. 20, 2017, https://newswatchtv.com/2017/10/20/party-play-newswatch-review/ , 2 pgs.
Buskirk, Audio Vroom changes the social radio game, http://evolver.fm/2011/03/23/audiovroom-changes-the-social-radio-game/, Mar. 23, 2011, 5 pgs.
O'Driscoll, Office Action, U.S. Appl. No. 15/087,448, dated Aug. 1, 2016, 20 pgs.

(56) References Cited

OTHER PUBLICATIONS

O'Driscoll, Final Office Action, U.S. Appl. No. 15/087,448, dated Jan. 19, 2017, 24 pgs.
O'Driscoll, Office Action, U.S. Appl. No. 15/087,448, dated Aug. 3, 2017, 37 pgs.
O'Driscoll, Final Office Action, U.S. Appl. No. 15/087,448, dated Mar. 12, 2018, 39 pgs.
O'Driscoll, Office Action, U.S. Appl. No. 15/087,448, dated Aug. 15, 2018, 33 pgs.
O'Driscoll, Final Office Action, U.S. Appl. No. 15/087,448, dated Mar. 27, 2019, 42 pgs.
O'Driscoll, Office Action, U.S. Appl. No. 15/087,448, dated Nov. 21, 2019, 45 pgs.
O'Driscoll, Final Office Action, U.S. Appl. No. 15/087,448, dated Jul. 13, 2020, 45 pgs.
Pauws, et al., "Fast Generation of Optimal Music Playlists using Local Search", Philips Research Europe, 2006, 6 pages.
Patricks, Notice of Allowance, U.S. Appl. No. 16/903,085, dated Jul. 23, 2021, 5 pgs.
Patricks, Office Action, U.S. Appl. No. 16/903,085, dated Mar. 29, 2021, 8 pgs.
Patricks, Notice of Allowance, U.S. Appl. No. 16/903,078, dated Jul. 13, 2022, 9 pgs.
Patricks, Office Action, U.S. Appl. No. 16/903,078, dated Sep. 10, 2021, 20 pgs.
Patricks, Final Office Action, U.S. Appl. No. 16/903,078, dated Mar. 28, 2022, 27 pgs.
Patricks, Office Action, U.S. Appl. No. 17/506,512, dated Jul. 27, 2022, 7 pgs.
Patricks, Notice of Allowance, U.S. Appl. No. 17/506,512, dated Sep. 28, 2022, 5 pgs.
Spotify AB, Extended European Search Report, EP21165870.3, dated Jun. 8, 2021, 7 pgs.
Stojmenovic, et al., "Bluetooth scatternet formation in ad hoc wireless networks", University of Ottawa, Jan. 2006, 28 pages.
Sutterer, et al., "UPOS: User Profile Ontology with Situation-Dependent Preferences Support", First International Conference on Advances in Computer-Human Interaction, Mar. 2008, pp. 230-235, 6 pages.
Wang, et al., "Context-Aware Mobile Music Recommendation for Daily Activities", School of Computing, National University of Singapore, MM'12, Oct. 29-Nov. 2, 2012, pp. 99-108, 10 pages.
Xiao, et al., "Learning a Music Similarity Measure on Automatic Annotations with Application to Playlist Generation", CASSP 2009, pp. 1885-1888, 4 pages.
Written Opinion of the International Preliminary Examining Authority dated Jun. 10, 2016 for PCT International Patent Application No. PCT/EP2016/057177, 8 pages.
International Search Report and Written Opinion of the International Searching Authority dated Jul. 11, 2016 for PCT International Patent Application No. PCT/EP2016/057175, 12 pages.
United States Patent and Trademark Office, Office Action dated Sep. 22, 2016 for U.S. Appl. No. 15/087,455, 10 pages.
United States Patent and Trademark Office, Office Action dated Sep. 26, 2016 for U.S. Appl. No. 15/087,428, 9 pages.
United States Patent and Trademark Office, Final Office Action dated Mar. 8, 2017 for U.S. Appl. No. 15/087,455, 11 pages.
United States Patent and Trademark Office, Office Action dated Mar. 29, 2017 for U.S. Appl. No. 15/087,428, 14 pages.
International Preliminary Report on Patentability dated May 31, 2017 for PCT International Patent Application No. PCT/EP2016/057176, 11 pages.
United States Patent and Trademark Office, Office Action dated Oct. 26, 2017 for U.S. Appl. No. 15/087,455, 13 pages.
United States Patent and Trademark Office, Office Action dated Jan. 5, 2018 for U.S. Appl. No. 15/087,428, 16 pages.
Communication pursuant to Article 94(3) EPC dated Apr. 24, 2018 for EP Application No. 16712927.9, 5 pages.
Communication pursuant to Article 94(3) EPC dated Apr. 24, 2018 for EP Application No. 16712928.7, 6 pages.
United States Patent and Trademark Office, Notice of Allowance dated Jun. 14, 2018 for U.S. Appl. No. 15/087,455, 27 pages.
United States Patent and Trademark Office, Office Action dated Aug. 2, 2018 for U.S. Appl. No. 15/087,428, 16 pages.
Summons to attend oral proceedings pursuant to Rule 115(1) EPC mailed Oct. 10, 2018 for EP Application No. 16712927.9, 7 pages.
Result of consultation by telephone from the applicant dated Feb. 8, 2019 for EP Application No. 16712927.9, 4 ages.
Communication pursuant to Article 94(3) EPC dated May 10, 2019 for EP Application No. 16712928.7, 8 pages.
United States Patent and Trademark Office, Office Action dated Jun. 20, 2019 for U.S. Appl. No. 15/087,428, 15 pages.
Decision to grant a European patent pursuant to Article 97(1) EPC dated Jul. 11, 2019 for EP Application No. 16712927.9, 2 pages.
Extended European Search Report dated Jul. 11, 2019 for EP Application No. 19172512.6, 10 pages.
Spotify AB, Communication pursuant to Article 94(3), EP21165870.3, dated Oct. 20, 2022, 5 pgs.
United States Patent and Trademark Office, Office Action dated Feb. 13, 2020 for U.S. Appl. No. 15/087,428, 17 pages.
Elliott et al., Personal Soundtrack: Context-aware playlists that adapt to user pace, Proceedings of ACM CHI 2006, Apr. 22-28, 2006, Montreal, Quebec, Canada, pp. 736-741 (Year: 2006).

300

302 At an electronic device associated with a media-providing service and having one or more processors and memory storing instructions for execution by the one or more processors:

304 Generate a respective user queue for each user of a plurality of users participating in a shared listening session, the shared listening session having a shared playback queue comprising one or more media content items from the user queues, including a first media content item requested by a first user of the plurality of users.

306 While providing the first media content item for playback in the shared listening session:

308 Receive a second request, from the first user, to add a second media content item to the shared playback queue 310 In response to the second request, update the respective user queue for the first user to include the second media content item 312 After receiving the second request, receive a third request, from a second user of the plurality of users, to add a third media content item to the shared playback queue 314 In response to the third request, update the respective user queue for the second user to include the third media content item (A)

FIGURE 3A

316 Update the shared playback queue using the respective user queues of the first user and the second user, including positioning the third media content item in an order of the shared playback queue to be played back before the second media content item in the shared listening session > 318 Updating the shared playback queue comprises positioning a plurality of media content items requested by the first user before playing a plurality of media content items requested by the second user > 320 Updating the shared playback queue comprises determining whether media content items have been added to the respective user queues. In accordance with a determination that one or more media content items have been added to any of the respective user queues:
>
> clear the shared playback queue; and
>
> regenerate the shared playback queue to include the media content items in the respective user queues, including the one or more media content items that have been added > 322 Updating the shared playback queue comprises determining whether media content items have been added to the respective user queues. In accordance with a determination that one or more media content items have been added to any of the respective user queues, add the one or more media content items to the shared playback queues without clearing the shared playback queue > 324 Updating the shared playback queue further comprises removing the second media content item from the shared playback queue in response to initiating playback of the second media content item

326 Provide, for playback in the shared listening session, the third media content item based on the order of the shared playback queue.

FIGURE 3B

METHODS AND SYSTEMS FOR INTERACTIVE QUEUING FOR SHARED LISTENING SESSIONS

RELATED APPLICATIONS

This application is a continuation of U.S. patent application Ser. No. 16/903,078, entitled "Methods and Systems for Interactive Queuing for Shared Listening Sessions," filed Jun. 16, 2020, which is incorporated by reference herein in its entirety.

This application is related to U.S. patent application Ser. No. 16/903,085, now U.S. Pat. No. 11,197,068, entitled "Methods and Systems for Interactive Queuing for Shared Listening Sessions based on User Satisfaction," filed Jun. 16, 2020.

TECHNICAL FIELD

The disclosed embodiments relate generally to media playback, and, in particular, providing shared media playback sessions.

BACKGROUND

Access to electronic media, such as music and video content, has expanded dramatically over time. As a departure from physical media, media content providers stream media to electronic devices across wireless networks, improving the convenience with which users can digest and experience such content.

SUMMARY

Some embodiments of the present disclosure provide shared listening sessions (also referred to throughout as shared playback sessions). In a shared listening session, a plurality of users can add media content to be played back to a group (either on a single presentation device, e.g., at a party, or on each user's individual device at remote locations). For example, each user participating in the shared listening session is able contribute to and control a collection of media content (e.g., a collectively-generated queue), which is played back simultaneously to each of the users in the group (either using a presentation system common to the group, such as a speaker in a room with all of the users, or separately, using the user's individual devices). In this way, each of a plurality of users is enabled to access, contribute to, and control playback of a shared queue.

A user participating in a shared listening session may feel that other users are "hogging the jukebox," e.g., by adding more than their fair share of content items to the queue. Accordingly, there is a need for systems and methods for queuing (ordering) media content items requested by different users fairly, so that individual users do not monopolize the content.

To address this problem, a method of ordering content added by a plurality of users to a shared listening session is provided. The method mitigates the problem of individual users monopolizing content in a shared listening session by storing an individual user queue for each user, and drawing from the individual user queues to produce a shared playback queue (e.g., a master queue). Any content that a user wants to add to the shared listening session is put into that user's individual user queue. The shared playback queue can be re-ordered or regenerated (e.g., fairly) whenever a user adds content to their respective individual queue. For example, one media content item (e.g., the first track in each user's individual queue) is drawn from each individual queue before taking a second media content item from any individual queue.

In accordance with some embodiments, a method is performed at an electronic device (e.g., associated with a media content provider) having one or more processors and memory storing instructions for execution by the one or more processors. The method includes generating a respective user queue for each user of a plurality of users participating in a shared listening session, the shared listening session having a shared playback queue comprising one or more media content items from the user queues, including a first media content item requested by a first user of the plurality of users. The method further includes, while providing the first media content item for playback in the shared listening session, receiving a second request, from the first user, to add a second media content item to the shared playback queue. The method includes, in response to the second request, updating the respective user queue for the first user to include the second media content item. The method further includes, after receiving the second request, receiving a third request, from a second user of the plurality of users, to add a third media content item to the shared playback queues and, in response to the third request, updating the respective user queue for the second user to include the third media content item. The method further includes updating the shared playback queue using the respective user queues of the first user and the second user, including positioning the third media content item in an order of the shared playback queue to be played back before the second media content item in the shared listening session. The method includes providing, for playback in the shared listening session, the third media content item based on the order of the shared playback queue.

In accordance with some embodiments, an electronic device (e.g., a server system, a client device, etc.) includes one or more processors and memory storing one or more programs configured to be executed by the one or more processors. The one or more programs include instructions for performing the operations of the method described above. In accordance with some embodiments, a computer-readable storage medium has stored therein instructions that, when executed by an electronic device, cause the server system to perform the operations of the method described above.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 3A-3C are flow diagrams illustrating methods for presenting a shared listening session in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first client device could be termed a second client device, and, similarly, a second client device could be termed a first client device, without departing from the scope of the various described embodiments. The first client device and the second client device are both client devices, but they are not the same client device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
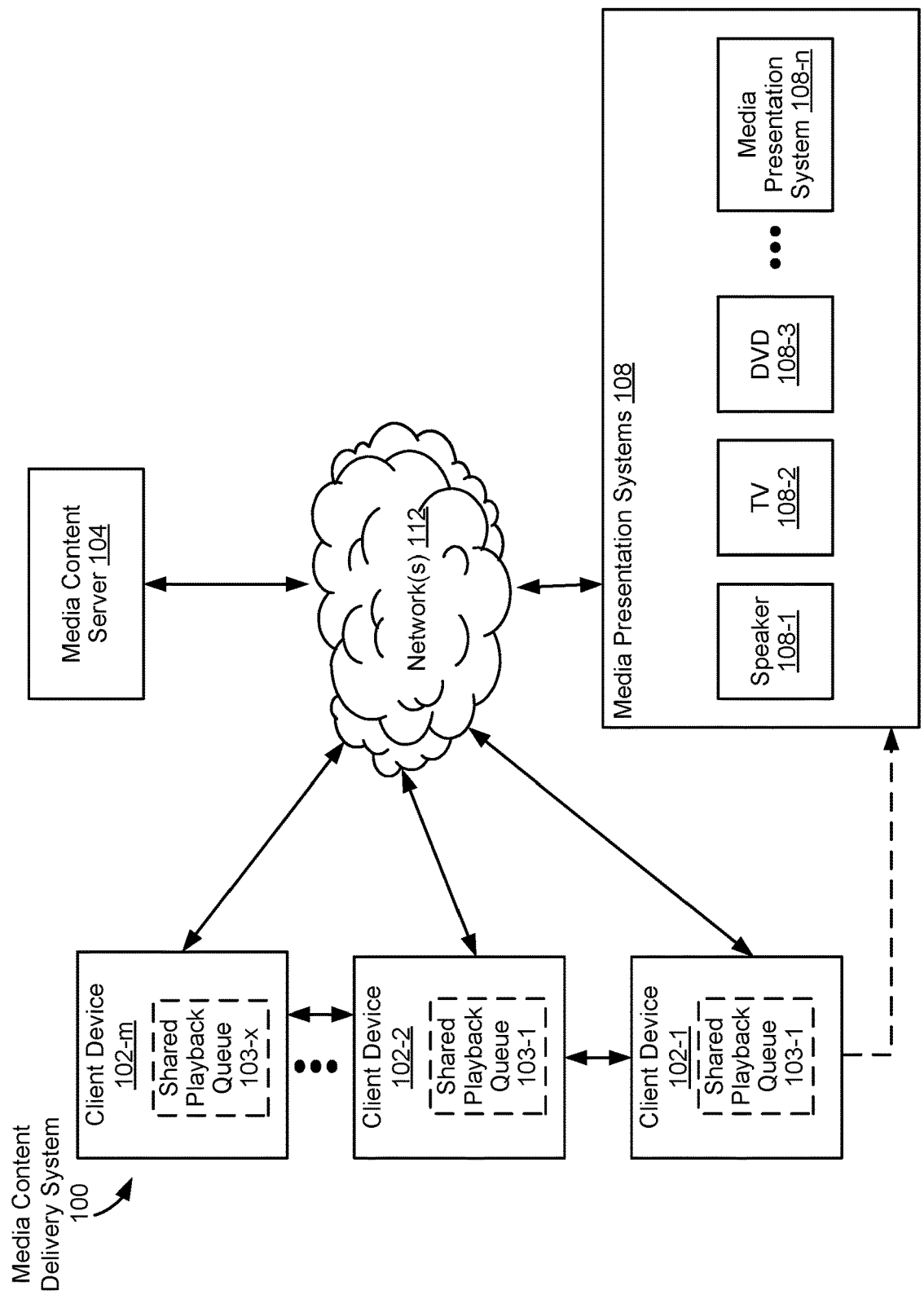
FIG. 1 is a block diagram illustrating a media content delivery system in accordance with some embodiments.

FIG. 1 is a block diagram illustrating a media content delivery system 100 in accordance with some embodiments. The media content delivery system 100 includes one or more client devices 102 (e.g., client device 102-1 to client device 102-*m*, where m is an integer greater than one), one or more media content servers 104, and one or more media presentation systems 108, including speaker 108-1, television (TV) 108-2, digital versatile disk (DVD) player 108-3, and/or other media presentation system 108-*n* (where n is an integer greater than three). The one or more media content servers 104 are associated with (e.g., at least partially compose) a media-providing service. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, a client device 102-1, 102-2, or 102-*m* is associated with one or more users. In some embodiments, a client device 102 is a personal computer, mobile electronic device, wearable computing device, laptop computer, tablet computer, mobile phone, feature phone, smart phone, digital media player, or any other electronic device capable of presenting media content (e.g., audio and/or video). A client device 102 connects to a media presentation system 108 wirelessly or through a wired connection (e.g., directly through an interface, such as an HDMI interface). In some embodiments, a client device 102 is a headless client. In some embodiments, client devices 102-1 and 102-*m* are the same type of device (e.g., client device 102-1 and client device 102-*m* are both mobile devices). Alternatively, client device 102-1 and client device 102-*m* are different types of devices.

In some embodiments, client devices 102-1, 102-2, and 102-*m* send and receive media-control information through the networks 112. For example, client devices 102-1, 102-2, and 102-*m* send media control requests (e.g., requests to play music, movies, videos, or other media items, or playlists thereof) to media content server 104 through network(s) 112. In some embodiments, client devices 102-1, 102-2, and 102-*m*, receive authentication tokens from the media content server 104 through network(s) 112.

In some embodiments, client device 102-1 communicates directly (e.g., through a wired and/or wireless connection) with client devices 102-2 and/or 102-*m*. For example, in some embodiments client devices 102 directly communicate playback commands and/or audio code signals between each other (e.g., the media content server 104 may or may not be involved in the exchange). In some embodiments, client device 102-2 communicates directly with client device 102-*m*. In some embodiments, client device 102-1 communicates directly with media presentation systems 108. As pictured in FIG. 1, client device 102-1 is able to communicate directly (e.g., through a wired and/or wireless connection) with media presentation systems 108, while client device 102-*m* communicates with the media presentation systems 108 through network(s) 112. In some embodiments, client device 102-1 uses the direct connection with media presentation systems 108 to stream content (e.g., data for media items) for playback on the media presentation systems 108.

In some embodiments, client device 102-1, client device 102-2 and client device 102-*m* each include a media application 422 (FIG. 4) that allows a user of the client device to browse, request (e.g., for playback at the client device 102 and/or a media presentation system 108), and/or present media content (e.g., control playback of music tracks, videos, etc.). Media content may be stored locally (e.g., in memory 412 of the client device 102, FIG. 4) and/or received in a data stream (e.g., from the media content server 104). The media presentation system 108 may be part of the client device 102, such as built-in speakers and/or a display, or may be separate from the client device 102, such as a wirelessly coupled speaker (e.g., speaker 108-1).

In some embodiments, client device 102-1 and client device 102-2 each include an instance of shared playback queue 103-1 (e.g., within media application 422). In some embodiments, shared playback queue 103-1 includes a set (e.g., an ordered list, such as a playlist) of media content items provided by the media content server 104. For example, the media content server 104 establishes a shared playback session (e.g., for two or more client devices of two or more users), stores a shared playback queue corresponding to the shared playback session, and/or provides the shared playback queue to the two or more client devices (e.g., client device 102-1 and client device 102-2). In some embodiments, the two or more client devices 120 are enabled to view and/or edit (e.g., add, remove, and/or reorder) content in the shared playback queue. For example, client device 102-1 and client device 102-2 are each provided with at least a portion of the same shared playback queue 103-1. In some embodiments, the shared playback queue 103-1 includes media content items selected by any combination of client device 102-1, client device 102-2, any other client device(s) 102, presentation systems 108, and/or the media content server 104. In some embodiments, the media content items from the shared playback queue are streamed to (e.g., played at and/or provided to) one or more of media presentation systems 108. For example, each client device 102-1 and client device 102-2 accesses (e.g., views, edits (adds and/or removes media content items from), and/or controls presentation of) the shared playback queue 103-1 while the shared playback queue is presented at one or more of media presentation systems 108. Co-located users are enabled to access the shared playback queue 103-1 on individual devices while streaming media content through media presentation system 108. In some embodiments, the media content items from the shared playback queue are streamed to each of the client devices 102-1 and 102-2 (e.g., instead of or in addition to media presentation system 108). It is to be understood that the shared playback queue 103-1 is enabled to be shared on additional client devices 102 in addition to client device 102-1 and client device 102-2. In some embodiments, a shared playback queue 103-x (distinct from shared playback queue 103-1) is shared between a plurality of client devices 102 (including client device 102-m). For example, the media content server 104 provides a plurality of shared playback queues 103-1 through 103-x, where the shared playback queue 103-1 is provided to a first subset of client devices 102 (e.g., client devices 102-1 and 102-2) and the shared playback queue 103-x is provided to a second subset of client devices 102 (e.g., including client device 102-m) (e.g., distinct from the first subset).

In some embodiments, the media content server 104 stores and provides media content (also referred to as media items) (e.g., media content requested by the media application 422 of client device 102-1, 102-2, and/or 102-m, and/or the shared playback queue 103-1) to client devices 102 and/or media presentation systems 108 via the network(s) 112. Content stored and served by the media content server 104, in some embodiments, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). Audio media items (i.e., audio items) may be referred to as tracks. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-n) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some embodiments, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

In some embodiments, the first user joins (e.g., initiates) a shared playback session with one or more other uses, including a second user. In some embodiments, the electronic device (e.g., server 104) initiates the shared playback session by generating a shared playback queue 214 (e.g., or shared playback queue 103-1). For example, the shared playback queue 214 is a queue that combines requests from the users that participate in the shared playback session. For example, the shared queue includes media content items requested from user 1 (e.g., the first user) and media content items requested from user 2 (e.g., the second user). In some embodiments, the requests from each respective user are added to the respective user queue for that user. For example, requests added by a first user are included in first user queue 210, and requests added by a second user are included in a second user queue 212.

In some embodiments, media content items that are included in the shared playback queue 214 are played back (e.g., streamed) to each user that is participating in the shared playback session (e.g., to the first user and the second user). For example, each user is associated with an electronic device for playing back media content (e.g., client devices 102, FIG. 1). In some embodiments, the electronic devices each receive (e.g., stream) the media content item from the shared playback queue at substantially the same time. In some embodiments, the users are co-located and one or more electronic devices are indicated as the playback devices for the shared playback session. For example, a single media presentation system (e.g., media presentation system 108) is designated (e.g., by selection from a user) to play the media content of the shared queue, while the electronic devices (e.g., client devices 102) associated with the users are used, by a respective user, to request media content items to be added to the shared playback queue.

Figure 2A:
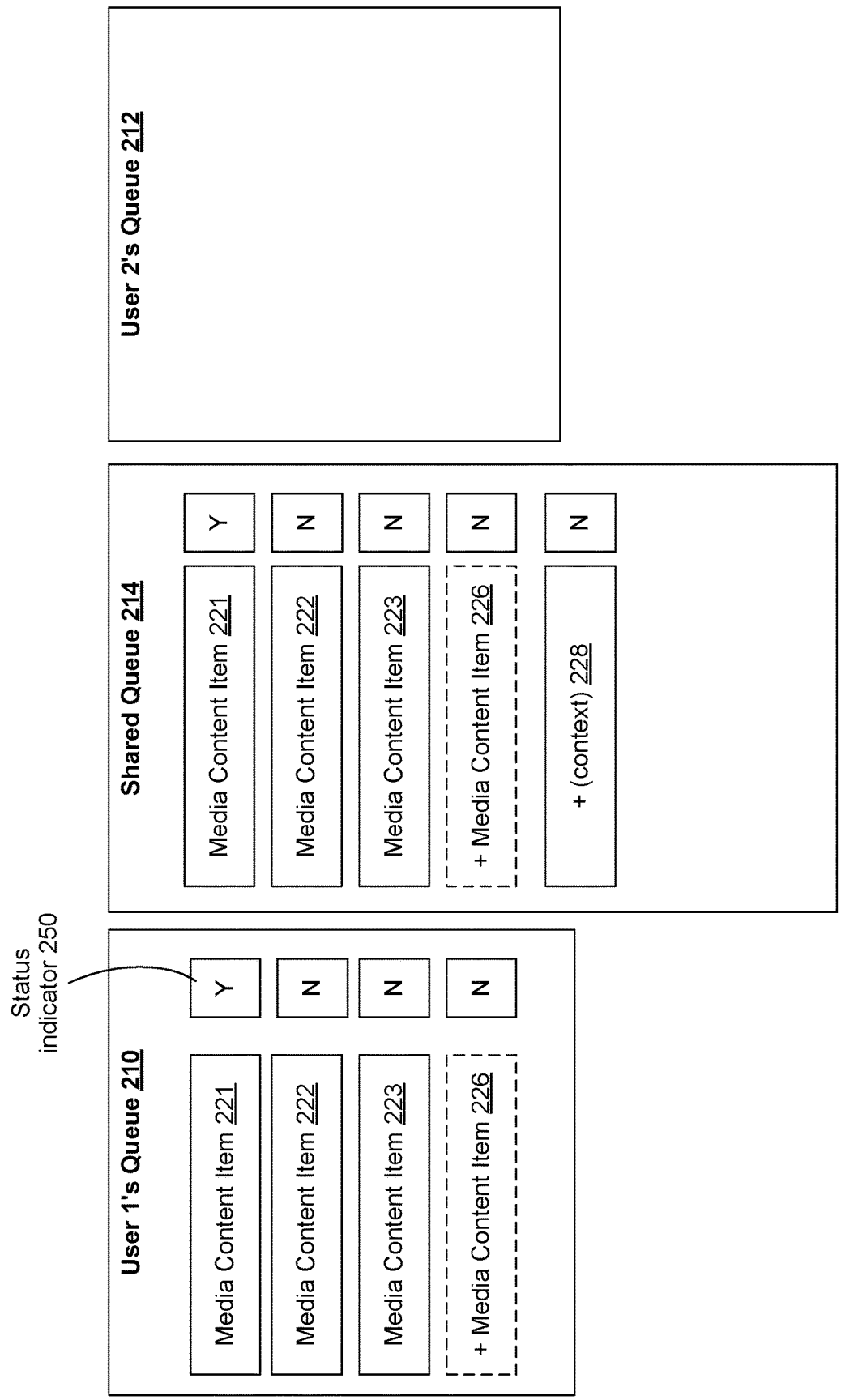
FIGS. 2A-2F illustrate queues at client devices participating in a shared listening session in accordance with some embodiments.

FIG. 2A illustrates a plurality of queues in accordance with some embodiments. In some embodiments, the plurality of queues illustrated in FIG. 2A comprise one or more data structures that are stored at an electronic device. FIG. 2A illustrates a first user queue 210 (e.g., "User 1's Queue") associated with a first user. In some embodiments, the first user queue 210 is stored at a first client device 102-1. In some embodiments, an electronic device stores all of the queues (e.g., the first user queue 210, the shared queue 214, and the second user queue 212). For example, the server system (e.g., media content server 104) stores all of the queues. In some embodiments, the respective client device of the respective user stores the user's queue and the shared queue (e.g., a copy of the shared queue). For example, client device 102-1 stores first user queue 210 and shared queue 214 (e.g., or shared playback queue 103-1, as illustrated in FIG. 1), and client device 102-2 stores second user queue 212 and the shared queue 214 (e.g., or shared playback queue 103-1). It will be understood that the queues can be stored at a single device, divided among a plurality of devices, or the queues (e.g., or some combination of the queues) are stored at each device.

In some embodiments, the data structure of a respective queue stores a status (e.g., previously presented or not yet presented) of each media content item in the queue. For example, each media content item in the first user queue includes a status indicator 250. For example, the status indicator is a field (e.g., in a data structure storing the user queue) that indicates whether a media content item has been presented to a user (e.g., during a current playback session). In some embodiments, the status indicator is automatically updated in accordance with a determination that a media content item has been presented to one or more users. For example, the status indicator 250 is initially assigned a status "N" (e.g., no) to represent that the content item has not yet been presented to the user(s). After presentation of the respective content item is initiated (e.g., or completed), the status indicator is updated (e.g., by the server and/or device storing the respective queues) from "N" to "Y" (e.g., yes) to indicate that the respective content item is presented to the user. In some embodiments, additional and/or alternative statuses are assigned to the media content items (e.g., a status indicating that an item is currently being presented to the user (now playing)). In some embodiments, the status indicator is maintained (e.g., updated) for each user queue that includes the media content item (e.g., media content item 221 has a status indicator of "Y" in user queue 210 and in shared queue 214). In some embodiments, the status indicator is maintained at only one queue (e.g., the user queue 210 or the shared queue 214) but not at the other queues. For example, only the shared queue 214 tracks (e.g., updates) the media content items that are played back (e.g., presented) in the shared listening session to the users.

FIG. 2A further illustrates the first user adding a media content item 226 to be played back in the shared listening session. For example, the user selects a media content item 226 (e.g., from a collection of media content items provided by a media content provider (e.g., stored at media content server 104 and/or stored locally at client device 102)). In some embodiments, the first user selects (e.g., at client device 102-1) the media content item 226. In some embodiments, media content item 226 is selected from a playlist, an album, or a search result presented to the user in media application 422 (e.g., using media content browsing module 426, FIG. 4). In some embodiments, in response to the first user adding media content item 226 to the first user queue 210, the shared queue 214 is also updated in include media content item 226. In some embodiments, shared queue 214 includes all of the media content items that are included in the user queues of users participating in the shared listening session. For example, shared queue 214 includes all of the media content items from user 1's queue 210 and user 2's queue 212. In some embodiments, shared queue 214 includes a subset (e.g., less than all) of the media content items included in the user queues of the participating users. In some embodiments, shared queue 214 combines the media content items from participating user queues and selects an order of the media content items in the shared queue.

In some embodiments, shared queue 214 includes additional media content items that are not requested by a user participating in the shared playback session. For example, shared queue 214 includes context 228. In some embodiments, context 228 includes one or more media content items that are selected without user input (e.g., automatically by the electronic device hosting the shared queue 214). For example, context 228 includes media content items identified as similar to one or more media content items that are requested by the users. In some embodiments, context 228 includes media content items that appear in a playlist, album, or other grouping that includes a media content item requested by a user. For example, the first user requests media content item 226 to be added to the shared queue 214. In some embodiments, the media content item 226 was selected (e.g., in the media application 422) from a playlist (e.g., a list of media content items). The context 228 includes the additional media content items from the playlist (e.g., other than media content item 226). Thus, the electronic device provides context 228 to the shared queue based on the selection of media content item 226 to the user.

For example, the first user selects media content item 223 from an album (e.g., an album includes media content item 223 and additional media content items). The content 228 in the shared queue is determined based on selected media content item 223 such that at least a portion of the additional media content items in the album are also added to shared queue 214. It will be understood that the context 228 is related to (e.g., based on) media content items selected by users participating in the shared playback session. In some embodiments, the context 228 is selected based on a single media content item in the shared queue (e.g., based on media content item 226 or media content item 223). In some embodiments, the context 228 is based on a plurality (e.g., or all) of the media content items in shared queue 214. In this way, the electronic device automatically adds media content items to the shared playback session based on the media content items that have been requested by the users. Users may stop requesting media content items (e.g., adding media content items to shared queue 214), and the shared queue continues playback by automatically selecting media content items in context 228. In some embodiments, the electronic device continues selecting (e.g., playing back) media content items in context 228 until the shared playback session ends. In some embodiments, the context 228 changes (e.g., modifies) the media content items in context 228 dynamically in accordance with the requests from the user. For example, the context 228 is updated to include media content items that relate to a most recently requested media content item in the shared queue 214. For example, the context 228 is selected to match (e.g., relate to) the last (e.g., most recent) media content item that was selected by a user in the shared playback session.

Figure 2B:
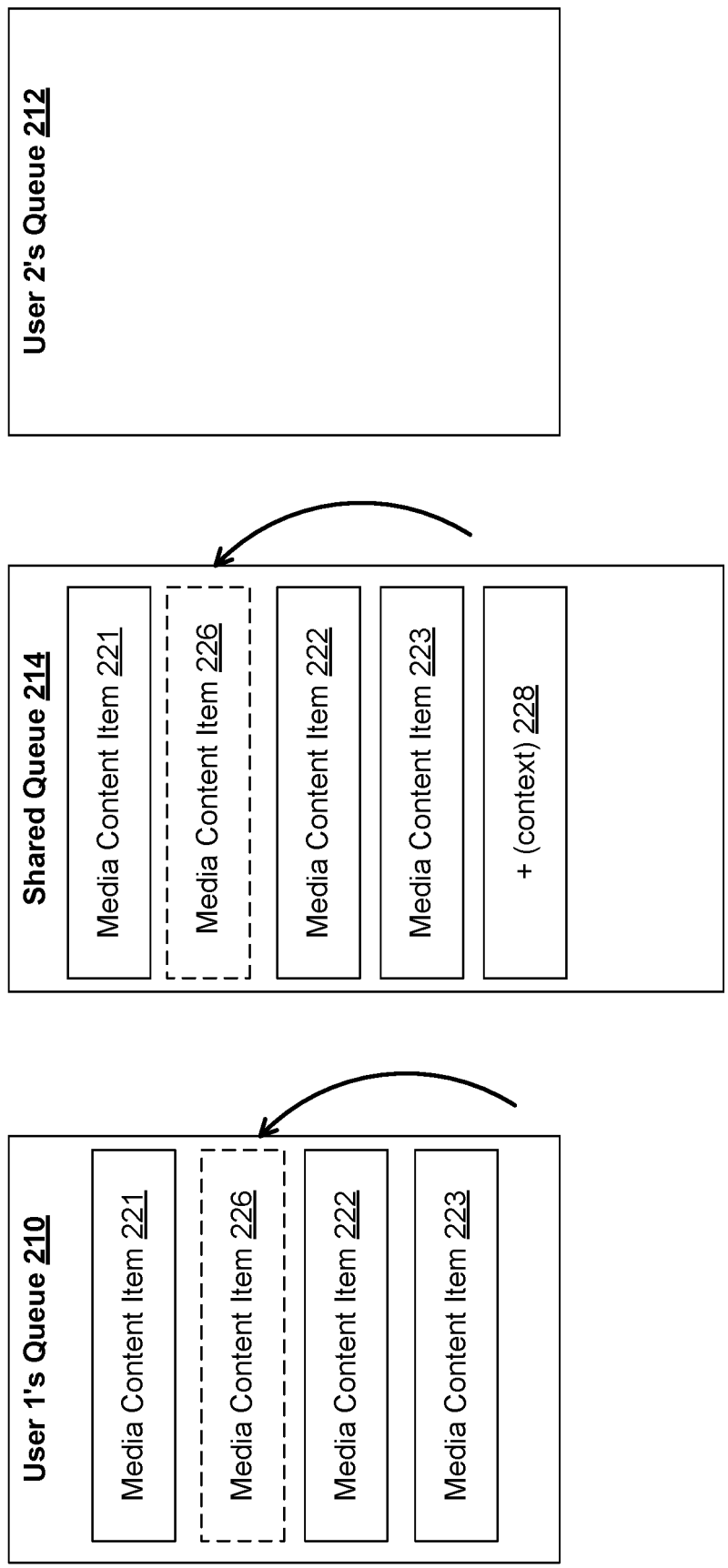

FIG. 2B illustrates an example of the first user changing an order of the media content items in the first user queue 210. For example, the first user moves (e.g., via a user input at client device 102-1) media content item 226 from the bottom of the queue (e.g., as shown in FIG. 2A) to the second content item in the first user queue 210 (e.g., between media content items 221 and 222). In some embodiments, the order of the media content items in shared queue 214 is also updated in response to the user input at the client device 102-1. For example, the shared queue 214 places the media content items in the same order as the order of the first user queue. In this example, the first user is enabled to change the order of media content items in the shared queue 214 by changing the order of the media content items in the first user queue 210. In some embodiments, the order of the shared queue 214 is not changed in response to the first user changing the order of the first user queue 210. For example, an order of media content items of shared queue 214 is determined independently (e.g., not in accordance with the order selected by the first user in the first user queue).

Figure 2C:
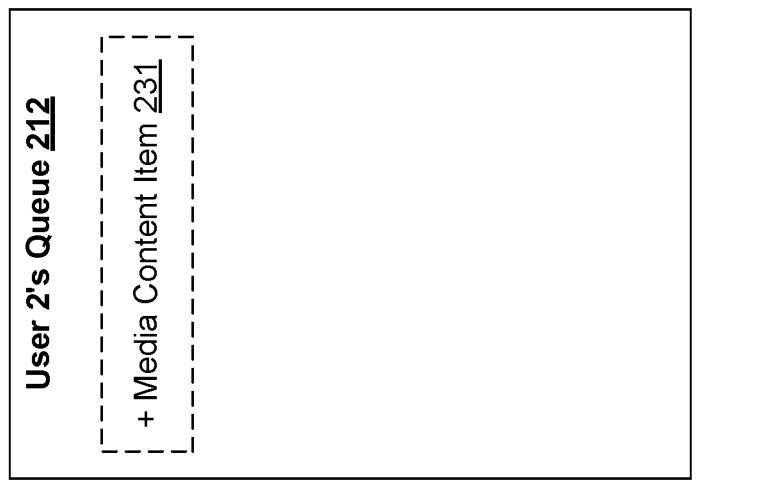
Figure 2C:
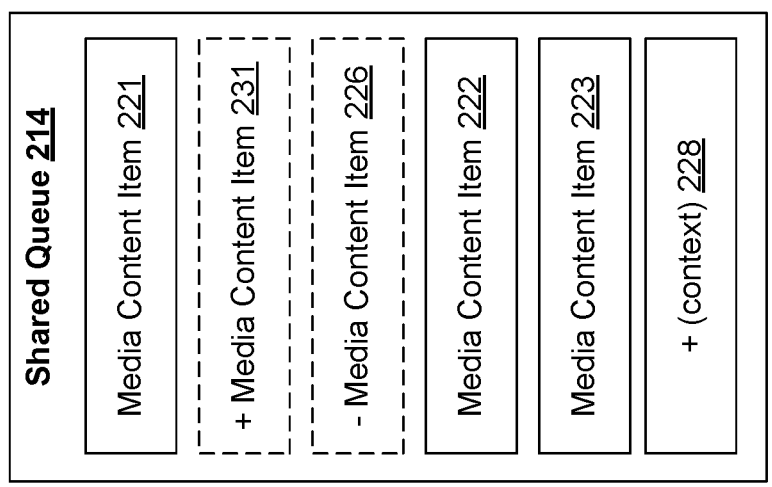
Figure 2C:
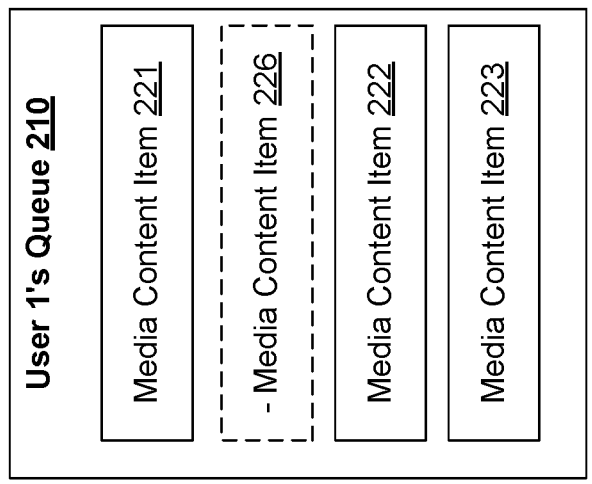

FIG. 2C illustrates a second user (e.g., that is participating in the shared playback session) adding a media content item 231 to the second user queue 212. In some embodiments, in response to the second user adding media content item 231 to the second user queue 212, the shared queue 214 is updated to include the media content item 231. In some embodiments, the shared queue 214 adds the media content item 231 to the shared queue in a position above (e.g., to be played back before) one or more media content items requested by the first user. For example, while media content items 222 and 223 were already requested by the first user and added to shared queue 214, when the second user adds media content item 231, it is ordered in the shared queue 214 in a position under media content item 221 and before media content items 222 and 223. In some embodiments, the order of the shared playback queue is determined based on the user that requested the media content item. For example, the shared queue 214 includes one media content item requested by the first user (e.g., media content item 221) followed by a media content item requested by the second user (e.g., media content item 231). The shared queue thus selects an order of the media content item to provide media content items added by different users. For example, even when a second user adds one or more media content items (e.g., media content item 231) after a first user adds one or more media content items, the media content items in shared queue 214 are ordered to provide the media content items such that a single user does not monopolize the shared queue.

FIG. 2C also illustrates the first user removing media content item 226 from the first user queue 210. In response to the first user removing media content item 226, the shared queue 214 is also updated to remove media content item 226.

Figure 2D:
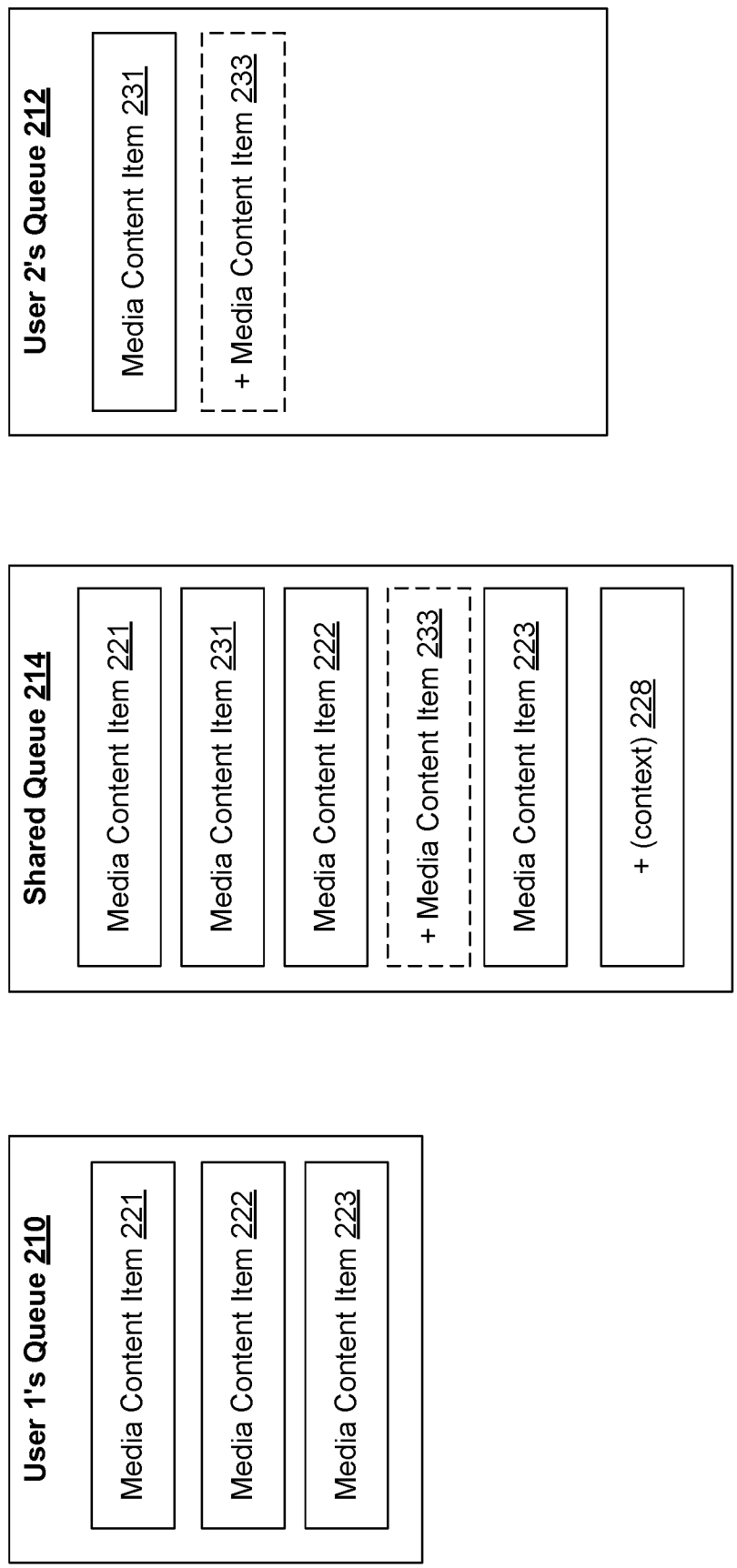

FIG. 2D illustrates the second user adding another media content item 233 to the second user queue 212. Similar to the process described with reference to FIG. 2C, the shared queue 214 adds the requested media content item 233 to the shared queue in a position such that the content items requested by each user are alternated. It should be understood that alternating the media content items based on the user that requested the respective media content item includes periodically alternating media content items (e.g., every one, two or three, etc. media content items). In some embodiments, when a first user queue has more media content items than the second user queue, the media content items requested by the first user are played back (e.g., without requiring the second user to request additional media content items). For example, the shared queue alternates between media content items requested from each user until one of the user queues is empty (e.g., does not include additional un-played media content items), and then plays the media content items from the other user queue until another media content item is received from the second user.

Figure 2E:
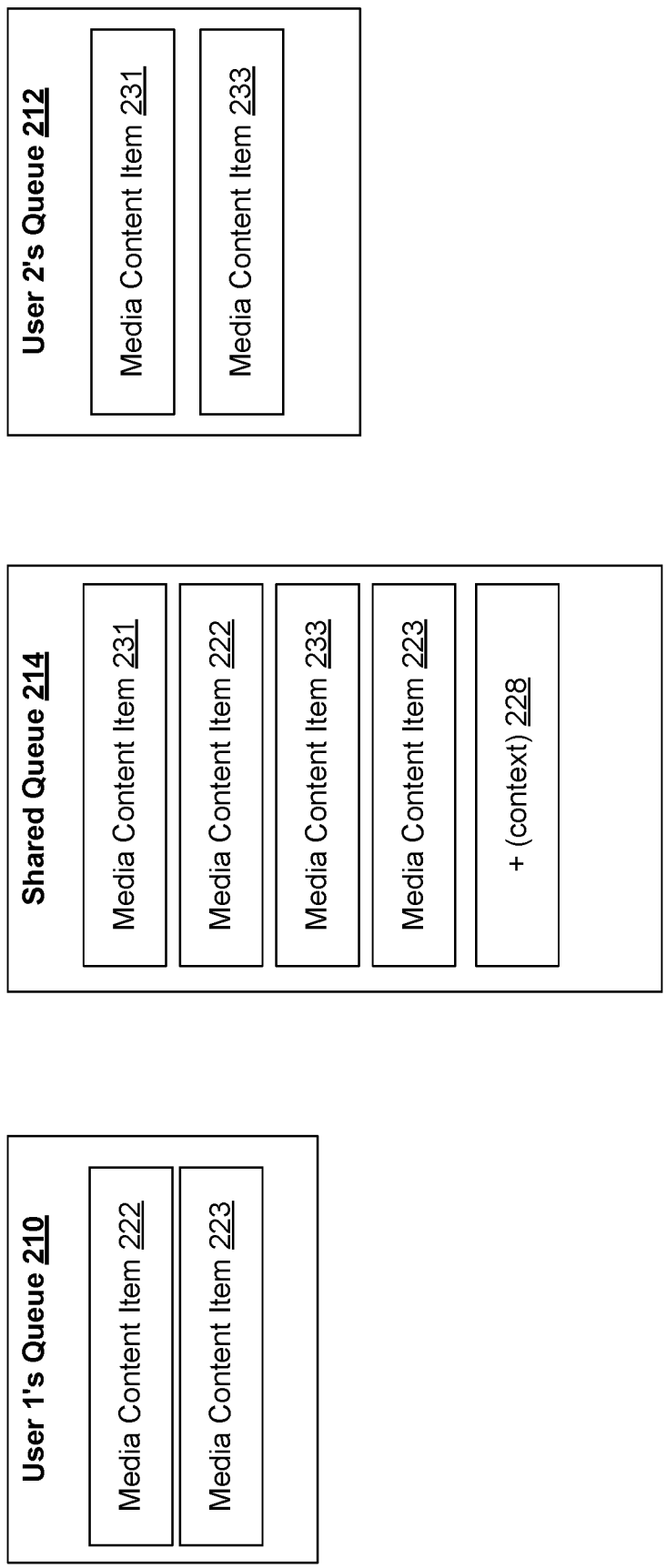

FIG. 2E illustrates that a media content item is removed from one or more queues in accordance with a determination that the media content item has been presented. For example, media content item 221 was played back in the shared playback session (e.g., by streaming to the one or more client devices and/or presentation devices). In some embodiments, the media content item is removed as soon as playback is initiated (e.g., whether or not the media content item is played all the way through). In some embodiments, the media content item is removed after completing playback of the media content item. In some embodiments, the media content item is removed in accordance with a determination that a user "skips" the media content item (e.g., stops playback of the media content item). In some embodiments, the media content item is not removed from any of the queues. For example, as described with reference to FIG. 2A, when a media content item is provided, a status indicator for the media content item is updated (e.g., without removing the media content item).

Figure 2F:
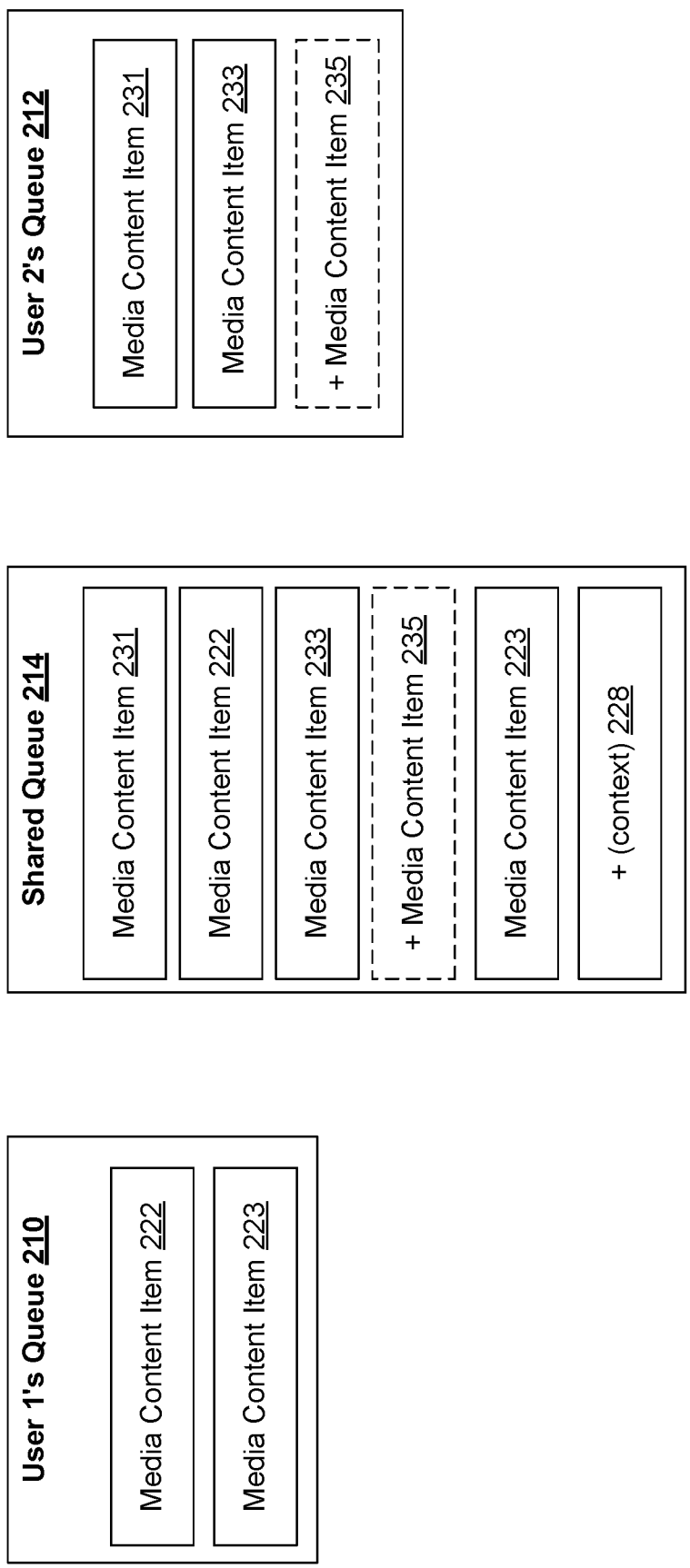

FIG. 2F illustrates the second user adding a media content item 235. In this example, the shared queue 214 plays back multiple requests from the second user in a row (e.g., media content items 233 and 235). For example, the shared queue 214 orders media content items not by simply alternating between requests from the first and second user, but also based on the number of media content items already provided that were requested by a first user. For example, the shared queue provided a plurality of media content items requested by the first user, so the additional media content item 235 is moved up in the shared queue 214 such that the second user's requests get played before more media content items requested by the first user. In some embodiments, the shared queue 214 tracks a number of media content items requested by each user, and/or a number of media content items requested by each user that have been played back in the shared queue 214, and determines an order of the upcoming media content items based on the tracked number of media content items. For example, the shared queue 214 calculates where to order media content item 235 requested from the second user based on the media content items that were requested by the first user (e.g., to maintain and/or achieve equal numbers).

It will be understood that the requests illustrated in FIGS. 2A-2F can occur sequentially (e.g., in the order presented in FIGS. 2A-2F). Alternatively, the requests can occur in a different order and/or multiple requests can occur at substantially the same time.

In some embodiments, the first user queue 210 that includes the first set of media content items (e.g., media content items 221, 222, and 223) is displayed on a graphical user interface of a user device (e.g., client device 102-1). In some embodiments, each media content item in the first user queue is displayed as a link (e.g., a uniform resource locator (URL)). For example, a user is enabled to select (e.g., click) the media content item (e.g., link) and be directed to a user interface that displays information related to the selected media content item. In some embodiments, selection of the link causes the electronic device (e.g., client device 102-1 and/or media presentation system 108) to begin playback of the selected media content item in an application of a media content provider (e.g., for the user to preview the content). In some embodiments, the client device 102-1 of the first user displays the first user queue 210 on a user interface, including displaying each media content item as a selectable content item. For example, a user selects a content item to access additional information related to the content item (e.g., an artist, genre, album, or playlist that includes the content item). In some embodiments, a user can edit (e.g., in the user interface displaying the first user queue 210) the selectable content item with respect to the user queue 210 (e.g., the user can add additional content items to the queue, remove content items from the queue, change the order of the content items within the queue, etc.). For example, the user interface includes affordances that allow the user to modify the first user queue 210.

Figure 3C:
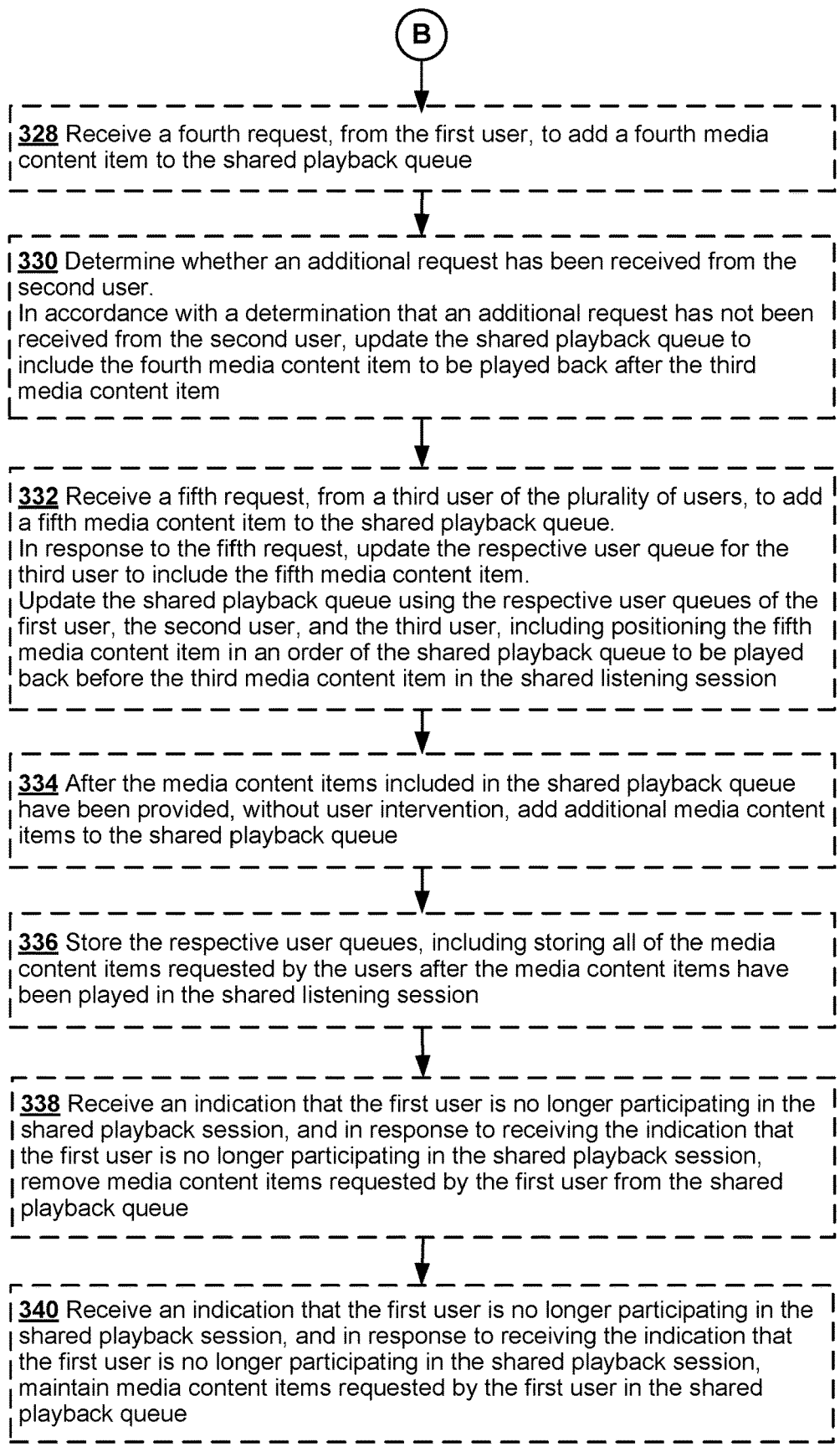

FIGS. 3A-3C are flow diagrams illustrating a method 300 for providing personalized content to a user, in accordance with some embodiments. Method 300 may be performed (302) at an electronic device (e.g., media content server 104, FIGS. 1 and 5; client device 102, FIGS. 1 and 4) having one or more processors and memory storing instructions for execution by the one or more processors. In some embodiments, the electronic device is associated with a media-providing service (e.g., provides media content for playback to client devices 102 and/or media presentation systems 108 in a media content delivery system 100, and/or executes an application for the media-providing service). In some embodiments, the method 300 is performed by executing instructions stored in the memory of a server system (e.g., in memory 506, FIG. 5) or client device (e.g., in memory 412, FIG. 4). In some embodiments, the method 300 is performed by a combination of the server system and a client device.

Referring now to FIG. 3A, in performing the method 300, the electronic device generates (304) a respective user queue for each user of a plurality of users participating in a shared listening session, the shared listening session having a shared playback queue comprising one or more media content items from the user queues, including a first media content item requested by a first user of the plurality of users. For example, the device receives a first request from the first user to add the first media content item to the shared queue. For example, first user queue 210, second user queue 212, and shared queue 214 are illustrated in FIGS. 2A-2F.

The electronic device, while providing the first media content item (306) for playback in the shared listening session, receives (308) a second request (e.g., after the first request), from the first user, to add a second media content item to the shared playback queue, and in response to the second request, updates (310) the respective user queue for the first user to include the second media content item. After receiving the second request, the electronic device receives (312) a third request, from a second user of the plurality of users, to add a third media content item to the shared playback queue, and, in response to the third request, updates (314) the respective user queue for the second user to include the third media content item. The electronic device updates (316) the shared playback queue using the respective user queues of the first user and the second user, including positioning the third media content item in an order of the shared playback queue to be played back before the second media content item in the shared listening session. For example, as described with reference to FIG. 2C, the electronic device provides media content item 221 (e.g., requested by the first user) and receives a second request, from the first user, to add media content item 222. The device also receives a third request (e.g., after the second request) from the second user to add media content item 231. The shared queue 214 is updated to include media content items 222 and 231.

The electronic device updating the shared playback queue comprises (318) positioning a plurality of media content items requested by the first user before playing a plurality of media content items requested by the second user. For example, the first user requests a plurality of media content items (e.g., in the user queue for the first user), and the second user requests a second plurality of media content items (e.g., in the user queue for the second user). In some embodiments, the first user requests are received before the second user requests are received. In some embodiments, the second user requests are received before the first user requests are received. In some embodiments, the electronic device positions (e.g., in the shared playback queue) two or more media content items from the plurality of media content items requested by the first user to be played back before any of the second plurality of media content items requested by the second user. For example, each user gets more than one media content item played (e.g., sequentially) before playing a media content item selected by another user. In some embodiments, this sequential pattern is repeated periodically (e.g., the shared playback queue includes 2 media content items to be played back, in a row, from each user).

In some embodiments, updating the shared playback queue comprises (320) determining whether media content items have been added to the respective user queues. In some embodiments, the electronic device, in accordance with a determination that one or more media content items have been added to any of the respective user queues, clears the shared playback queue and regenerates the shared playback queue to include the media content items in the respective user queues, including the one or more media content items that have been added.

In some embodiments, regenerating the shared playback queue includes tracking (e.g., marking and/or indicating) media content items that are updated. For example, in response to a user input from the first user to add and/or reorder one or more media content items in the user queue of the first user, the electronic device tracks these changes (e.g., corresponding to user inputs) and updates the shared playback queue according to the changes. In some embodiments, regenerating the shared playback queue comprises clearing a media content item that has been presented/played in the shared playback queue (e.g., and/or clearing one or more media content items that a user removes from a respective user queue).

In some embodiments, updating the shared playback queue comprises (322) determining whether media content items have been added to the respective user queues. In some embodiments, the electronic device, in accordance with a determination that one or more media content items have been added to any of the respective user queues, adds the one or more media content items to the shared playback queues without clearing the shared playback queue. For example, the electronic device generates (e.g., initiates) the shared queue 214 from user queues with existing media content items and dynamically updates the shared queue to add additional media content items that are added after initiation of the shared queue. In some embodiments, the additional media content items are marked (e.g., tracked).

In some embodiments, updating the shared playback queue further comprises (324) removing the second media content item from the shared playback queue in response to initiating playback of the second media content item. For example, FIGS. 2D-2E illustrate media content item 221 removed from the top of the shared queue in response to playing back media content item 221.

In some embodiments, the electronic device provides (326), for playback in the shared listening session, the third media content item based on the order of the shared playback queue. For example, the shared queue 214 is played back in the order determined based on which user requested the respective media content item.

In some embodiments, the electronic device receives (328) a fourth request, from the first user, to add a fourth media content item to the shared playback queue. In some embodiments, the fourth request is received after the second request and before the third request is received. In some embodiments, the fourth request is received after the second and the third requests are received. For example, the first user adds media content items to the first user queue 210, and the shared queue is updated accordingly.

In some embodiments, the electronic device determines (330) whether an additional request (e.g., after the third request) has been received from the second user. In some embodiments, in accordance with a determination that an additional request has not been received from the second user, the electronic device updates the shared playback queue to include the fourth media content item to be played back after the third media content item. For example, the electronic device does not require (e.g., wait for) the second user to request a media content item when the second user queue is empty, but the first user queue includes media content items. In some embodiments, the electronic device skips (e.g., when alternating between user queues) the queue of a respective user when the respective queue is empty. For example, instead of waiting for each user to add at least one content item to a respective user queue, the electronic device does not follow a round-robin ordering, and plays content items from the user queues of other users that have already added one or more content items to their respective user queues.

In some embodiments, the electronic device receives (332) a fifth request, from a third user of the plurality of users, to add a fifth media content item to the shared playback queue. In some embodiments, the fifth request is received after receiving the second request, after receiving the third request, and/or after receiving the fourth request. In some embodiments, in response to the fifth request, the electronic device updates the respective user queue for the third user to include the fifth media content item. In some embodiments, the electronic device updates the shared playback queue using the respective user queues of the first user, the second user, and the third user, including positioning the fifth media content item in an order of the shared playback queue to be played back before the third media content item in the shared listening session. For example, while FIGS. 2A-2F illustrate two user queues, it will be understood that a plurality of users (e.g., more than 2) can participate in a single shared listening session and request media content items to be added to shared queue 214.

In some embodiments, after the media content items included in the shared playback queue have been provided, without user intervention, the electronic device adds (334) additional media content items to the shared playback queue. For example, the electronic device automatically (e.g., without being requested by a user) selects media content items and puts them in the shared playback queue (e.g., in context 228, as described above). In some embodiments, the additional media content items are not in any of the user queues. In some embodiments, the additional media content items are selected based on a media content item added by a user. For example, the additional media content items share a characteristic (e.g., context) with one or more media content items that were added to the shared playback queue by a user. In some embodiments, the additional media content items represent a context (e.g., if a user adds a media content item (e.g., selected from another non-user-selected playback queue (e.g., album or computer generated playlist), the context is the rest of the album or playlist). In some embodiments, the electronic device adds items to the shared queue that are not selected by a user but are selected by the electronic device based on the context of a content item that was selected by a user (e.g., a content item in a user queue). In some embodiments, one or more of the additional media content items are selected based on a media content item requested by the first user and the remaining additional media content items are selected based on a media content item requested by the second user.

In some embodiments, the electronic device stores (336) the respective user queues, including storing all of the media content items requested by the users after the media content items have been played in the shared listening session. For example, the electronic device maintains the user queues and marks them as songs get played. For example, with reference to FIG. 2A, the playback queues include a field for tracking whether a media content item has been presented (e.g., "Y" (yes) or "N" (no) is placed next to each media content item in the playback queues).

In some embodiments, the electronic device receives (338) an indication that the first user is no longer participating in the shared playback session, and in response to receiving the indication that the first user is no longer participating in the shared playback session, removes media content items requested by the first user from the shared playback queue. For example, when a user leaves, the electronic device removes the media items from the shared playback queue that were added by user that leaves the session. In some embodiments, the electronic device clears the playback queue for the first user (e.g., both the individual queue and the shared playback queue are erased).

In some embodiments, the electronic device receives (340) an indication that the first user is no longer participating in the shared playback session, and in response to receiving the indication that the first user is no longer participating in the shared playback session, maintains media content items requested by the first user in the shared playback queue. For example, when a user leaves the shared playback session, the electronic device maintaining the media items added by the user in the shared queue (e.g., to be played back for the users that continue participating in the shared playback session).

Although FIGS. 3A-3C illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Figure 4:
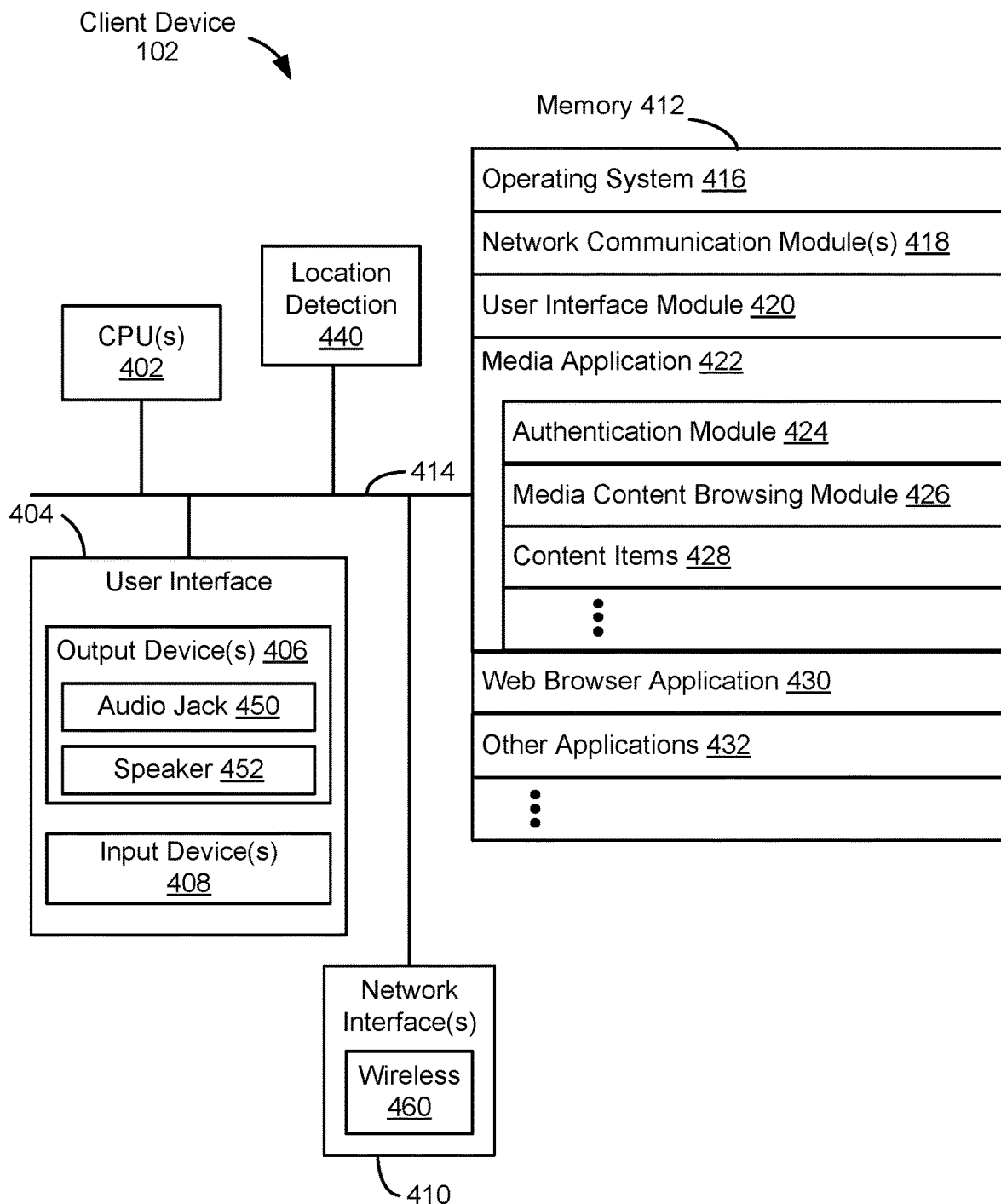
FIG. 4 is a block diagram illustrating a client device in accordance with some embodiments.

FIG. 4 is a block diagram illustrating a client device 102 (e.g., client device 102-1 and/or client device 102-m, FIG. 1) in accordance with some embodiments. The client device 102 includes one or more central processing units (CPU(s), i.e., processors or cores) 402, one or more network (or other communications) interfaces 410, memory 412, and one or more communication buses 414 for interconnecting these components. The communication buses 414 optionally include circuitry (sometimes called a chipset) that interconnects and controls communications between system components.

The client device 102 includes a user interface 404, including output device(s) 406 and input device(s) 408. In some embodiments, the input devices 408 include a keyboard, mouse, or track pad. Alternatively, or in addition, in some embodiments, the user interface 404 includes a display device that includes a touch-sensitive surface, in which case the display device is a touch-sensitive display. "User input," as described herein, may refer to a contact detected with a touch-sensitive display and/or an input by an input device 408. In some embodiments, the output devices (e.g., output device(s) 406) include a speaker 452 (e.g., speakerphone device) and/or an audio jack 450 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 440, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some embodiments, the one or more network interfaces 410 include wireless and/or wired interfaces for receiving data from and/or transmitting data to other client devices 102, media presentations systems 108, a media content server 104, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 410 include a wireless interface 460 for enabling wireless data communications with other client devices 102, media presentations systems 108, and/or or other wireless (e.g., Bluetooth-compatible) devices (e.g., for streaming audio data to the media presentations system 108 of an automobile). Furthermore, in some embodiments, the wireless interface 460 (or a different communications interface of the one or more network interfaces 410) enables data communications with other WLAN-compatible devices (e.g., a media presentations system 108) and/or the media content server 104 (via the one or more network(s) 112, FIG. 1).

In some embodiments, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 412 may optionally include one or more storage devices remotely located from the CPU(s) 402. Memory 412, or alternately, the non-volatile memory solid-state storage devices within memory 412, includes a non-transitory computer-readable storage medium. In some embodiments, memory 412 or the non-transitory computer-readable storage medium of memory 412 stores the following programs, modules, and data structures, or a subset or superset thereof:

- an operating system 416 that includes procedures for handling various basic system services and for performing hardware-dependent tasks;
- network communication module(s) 418 for connecting the client device 102 to other computing devices (e.g., media presentation systems 108, media content server 104, and/or other client devices) via the one or more network interface(s) 410 (wired or wireless) connected to one or more network(s) 112;
- a user interface module 420 that receives commands and/or inputs from a user via the user interface 404 (e.g., from the input devices 408) and provides outputs for playback and/or display on the user interface 404 (e.g., the output devices 406);
- a media application 422 (e.g., an application associated with and for accessing a content (i.e., media-providing) service provided by a media content provider such as media content server 104, including a media player, a streaming media application, or any other appropriate application or component of an application) for browsing, receiving, processing, presenting, and requesting playback of media (e.g., media items). The media application 422 is also used to monitor, store, and/or transmit (e.g., to media content server 104) data associated with user behavior. The media application 422 may include a content-personalization module (e.g., analogous to the content personalization module 524, FIG. 5) and also includes the following modules (or sets of instructions), or a subset or superset thereof:
    - an authentication module 424 for sending authentication tokens corresponding to one or more media presentation systems associated with the client device 102 (e.g., one or more of the media presentation systems 108 from FIG. 1), receiving authentication tokens from other devices, and/or generating authentication tokens for media presentation systems associated with client device 102;
    - a media content browsing module 426 for providing controls and/or user interfaces enabling a user to navigate, select for playback, and otherwise control or interact with media content, whether the media content is stored or played locally or remotely;
    - a content items module 428 for storing media items for playback, including storing a playback queue such as the shared playback queue 103;
- a web browser application 430 (e.g., Internet Explorer or Edge by Microsoft, Firefox by Mozilla, Safari by Apple, or Chrome by Google) for accessing, viewing, and interacting with web sites; and
- other applications 432, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some embodiments, the media presentation system 108 is a type of client device 102, and includes some or all of the same components, modules, and sub-modules as described above in FIG. 4 with respect to the client device 102.

Figure 5:
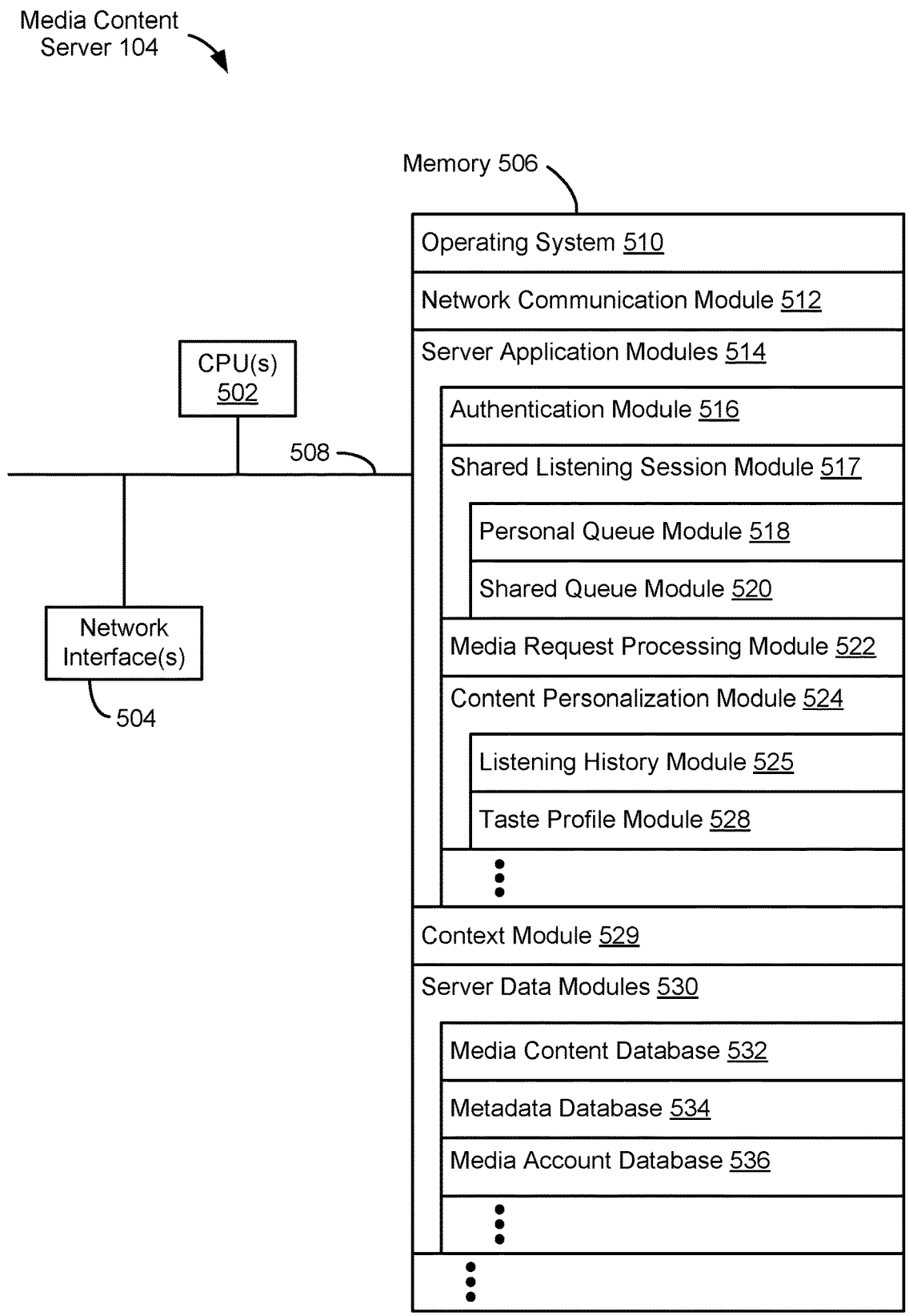
FIG. 5 is a block diagram illustrating a media content server in accordance with some embodiments.

FIG. 5 is a block diagram illustrating a media content server 104 in accordance with some embodiments. The media content server 104 typically includes one or more central processing units/cores (CPUs) 502, one or more network interfaces 504, memory 506, and one or more communication buses 508 for interconnecting these components.

Memory 506 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 506, optionally, includes one or more storage devices remotely located from one or more CPUs 502. Memory 506, or, alternatively, the non-volatile solid-state memory device(s) within memory 506, includes a non-transitory computer-readable storage medium. In some embodiments, memory 506, or the non-transitory computer-readable storage medium of memory 506, stores the following programs, modules and data structures, or a subset or superset thereof:

- an operating system 510 that includes procedures for handling various basic system services and for performing hardware-dependent tasks;
- a network communication module 512 that is used for connecting the media content server 104 to other computing devices via one or more network interfaces 504 (wired or wireless) connected to one or more networks 112;
- one or more server application modules 514 for performing various functions with respect to providing and managing a content service, the server application modules 514 including, but not limited to, one or more of:
  - an authentication module 516 for managing authentication and/or authorization requests;
  - a shared listening session module 517 for initiating and/or maintaining shared listening sessions, including, but not limited to, one or more of:
    - a personal queue module 518 for generating and/or updating personal queues for each user participating in the shared listening session; and
    - a shared queue module 520 for generating and/or updating the shared playback queue based on requests received from the users participating in the shared listening session, including determining an order of requested media content items included in the shared queue; and
  - a media request processing module 522 for processing requests for media content and facilitating access to requested media items by client devices (e.g., the client device 102) including, optionally, streaming media content to such devices and/or to one or more media presentation systems 108;
  - a content personalization module 524 for providing personalized content (e.g., playlists, tracks, advertisements, tooltips, notifications, etc.) to users of the content service, including, but not limited to, one or more of:
    - a listening history module 526 for processing (e.g., compiling) and storing data (e.g., in a listening history) relating to media content items that a user has consumed from the media-providing service (e.g., each user of the media-providing service has at least one listening history); and
    - a taste profile module 528 for processing (e.g., identifying and/or compiling) taste profiles (e.g., indicating user preferences for media content) for users of the media-providing service based on characteristics of the media content items included in the listening history of the respective user;
  - a context module 529 for determining and/or selecting additional media content items to include as the context of the shared queue;
- one or more server data module(s) 530 for handling the storage of and access to media items and metadata relating to the media items; in some embodiments, the one or more server data module(s) 530 include:
  - a media content database 532 for storing media items (e.g., audio files, video files, text files, etc.);
  - a metadata database 534 for storing metadata relating to the media items; and
  - a media account database 536 for storing account information for user media accounts, including user profiles, credentials (e.g., user identifiers, passwords, email addresses, etc.), credentials or identifiers of any linked accounts, and the like.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 412 and 506 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 412 and 506 optionally store a subset or superset of the respective modules and data structures identified above. Furthermore, memory 412 and 506 optionally store additional modules and data structures not described above. In some embodiments, modules stored in memory 412 may also be stored in memory 506 (and vice-versa). For example, the shared playback queue module 529 may be stored at the media content server 104 in memory 506 and/or stored in memory 412 at the client device 102.

Although FIG. 5 illustrates the media content server 104 in accordance with some embodiments, FIG. 5 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement the media content server 104, and how features are allocated among them, will vary from one embodiment to another and, optionally, depends in part on the amount of data traffic that the server system handles during peak usage periods as well as during average usage periods.

The foregoing description, for purpose of explanation, has been described with reference to specific embodiments.

However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at an electronic device having one or more processors and memory storing one or more programs for execution by the electronic device:
while providing a first media content item for playback in a shared listening session having a shared playback queue comprising one or more media content items from respective user queues, including a first media content item requested by a first user:
receiving a second request, from the first user, to adjust the shared playback queue with respect to a second media content item;
after receiving the second request, receiving a third request, from a second user, to add a third media content item to the shared playback queue;
in response to receiving the third request, updating the shared playback queue, including:
determining that the second media content item is adjusted in the shared playback queue by a same user that requested the first media content item currently provided for playback;
determining that the third media content item is added to the shared playback queue by a user other than the user that requested the first media content item in the shared playback queue; and
in accordance with the determination that the third media content item is added by a user other than the user that requested the first media content item and that the second media content item is adjusted in the shared playback queue by the same user as the first media content item currently provided for playback, positioning the third media content item added by the second user in an order of the shared playback queue to be played back before the second media content item, adjusted by the first user, in the shared listening session; and
providing, for playback in the shared listening session, the third media content item based on the order of the shared playback queue.

2. The method of claim 1, wherein the second request to adjust the shared playback queue with respect to the second media content item comprises a request to add the second media content item to the shared playback queue.

3. The method of claim 1, wherein the second request to adjust the shared playback queue with respect to a second media content item comprises a request to reorder the second media content item within the shared playback queue.

4. The method of claim 1, further comprising:
receiving a fourth request, from the first user, to add a fourth media content item to the shared playback queue;
determining whether an additional request has been received from the second user; and
in accordance with a determination that an additional request has not been received from the second user, updating the shared playback queue to include the fourth media content item to be played back after the third media content item.

5. The method of claim 1, further comprising:
generating a respective user queue for each user participating in the shared listening session, the shared listening session having a shared playback queue comprising one or more media content items from the respective user queues;
receiving a fifth request, from a third user, to add a fifth media content item to the shared playback queue;
in response to the fifth request, updating a respective user queue for the third user to include the fifth media content item; and
updating the shared playback queue using the respective user queues of the first user, the second user, and the third user, including positioning the fifth media content item in an order of the shared playback queue to be played back before the third media content item in the shared listening session.

6. The method of claim 5, wherein updating the shared playback queue comprises:
determining whether media content items have been added to the respective user queues, and
in accordance with a determination that one or more media content items have been added to any of the respective user queues:
clearing the shared playback queue; and
regenerating the shared playback queue to include the media content items in the respective user queues, including the one or more media content items that have been added.

7. The method of claim 5, wherein updating the shared playback queue comprises:
determining whether media content items have been added to the respective user queues; and
in accordance with a determination that one or more media content items have been added to any of the respective user queues, adding the one or more media content items to the shared playback queue without clearing the shared playback queue.

8. The method of claim 5, further comprising, storing the respective user queues, including storing all of the media content items requested by the first user and the second user after the media content items have been played in the shared listening session.

9. The method of claim 1, further comprising, after the media content items included in the shared playback queue have been provided, without user intervention, adding additional media content items to the shared playback queue.

10. The method of claim 1, wherein updating the shared playback queue comprises positioning a plurality of media content items requested by the first user before playing a plurality of media content items requested by the second user.

11. The method of claim 9, wherein the additional media content items are automatically selected based at least in part on one or more media items that were selected by a respective user for the shared listening session.

12. The method of claim 1, wherein updating the shared playback queue further comprises removing the second media content item from the shared playback queue in response to initiating playback of the second media content item.

13. The method of claim 1, further comprising:
receiving an indication that the first user is no longer participating in the shared listening session; and in response to receiving the indication that the first user is no longer participating in the shared listening session, removing media content items requested by the first user from the shared playback queue.

14. The method of claim 1, further comprising:
receiving an indication that the first user is no longer participating in the shared listening session; and
in response to receiving the indication that the first user is no longer participating in the shared listening session, maintaining media content items requested by the first user in the shared playback queue.

15. An electronic device, comprising:
one or more processors; and
memory storing one or more programs for execution by the one or more processors, the one or more programs including instructions for:
while providing a first media content item for playback in a shared listening session having a shared playback queue comprising one or more media content items from respective user queues, including a first media content item requested by a first user:
receiving a second request, from the first user, to adjust the shared playback queue with respect to a second media content item;
after receiving the second request, receiving a third request, from a second user, to add a third media content item to the shared playback queue;
in response to receiving the third request, updating the shared playback queue, including:
determining that the second media content item is adjusted in the shared playback queue by a same user that requested the first media content item currently provided for playback;
determining that the third media content item is added to the shared playback queue by a user other than the user that requested the first media content item in the shared playback queue; and
in accordance with the determination that the third media content item is added by a user other than the user that requested the first media content item and that the second media content item is adjusted in the shared playback queue by the same user as the first media content item currently provided for playback, positioning the third media content item added by the second user in an order of the shared playback queue to be played back before the second media content item, adjusted by the first user, in the shared listening session; and
providing, for playback in the shared listening session, the third media content item based on the order of the shared playback queue.

16. The electronic device of claim 15, wherein the second request to adjust the shared playback queue with respect to the second media content item comprises a request to add the second media content item to the shared playback queue.

17. The electronic device of claim 15, wherein the second request to adjust the shared playback queue with respect to a second media content item comprises a request to reorder the second media content item within the shared playback queue.

18. The electronic device of claim 15, the one or more programs further including instructions for:
receiving a fourth request, from the first user, to add a fourth media content item to the shared playback queue;
determining whether an additional request has been received from the second user; and
in accordance with a determination that an additional request has not been received from the second user, updating the shared playback queue to include the fourth media content item to be played back after the third media content item.

19. The electronic device of claim 15, the one or more programs further including instructions for:
receiving a fifth request, from a third user, to add a fifth media content item to the shared playback queue;
in response to the fifth request, updating the respective user queue for the third user to include the fifth media content item; and
updating the shared playback queue using the respective user queues of the first user, the second user, and the third user, including positioning the fifth media content item in an order of the shared playback queue to be played back before the third media content item in the shared listening session.

20. A non-transitory computer-readable storage medium having one or more processors and memory storing one or more programs for execution by an electronic device for:
while providing a first media content item for playback in a shared listening session having a shared playback queue comprising one or more media content items from respective user queues, including a first media content item requested by a first user:
receiving a second request, from the first user, to adjust the shared playback queue with respect to a second media content item;
after receiving the second request, receiving a third request, from a second user, to add a third media content item to the shared playback queue;
in response to receiving the third request, updating the shared playback queue, including:
determining that the second media content item is adjusted in the shared playback queue by a same user that requested the first media content item currently provided for playback;
determining that the third media content item is added to the shared playback queue by a user other than the user that requested the first media content item in the shared playback queue; and
in accordance with the determination that the third media content item is added by a user other than the user that requested the first media content item and that the second media content item is adjusted in the shared playback queue by the same user as the first media content item currently provided for playback, positioning the third media content item added by the second user in an order of the shared playback queue to be played back before the second media content item, adjusted by the first user, in the shared listening session; and
providing, for playback in the shared listening session, the third media content item based on the order of the shared playback queue.

\* \* \* \* \*